United States Patent [19]

Horiuchi

[11] Patent Number: 5,460,367
[45] Date of Patent: Oct. 24, 1995

[54] PRESSURELESS TENNIS BALL

[75] Inventor: Kuniyasu Horiuchi, Kobe, Japan

[73] Assignee: Sumitomo Rubber Industries, Ltd., Kobe, Japan

[21] Appl. No.: 876,459

[22] Filed: Apr. 30, 1992

[30] Foreign Application Priority Data

May 10, 1991 [JP] Japan ................................. 3-135629

[51] Int. Cl.$^6$ ................................. A63B 39/00
[52] U.S. Cl. ................. 273/610; 524/908; 260/998.14
[58] Field of Search .................. 273/58 R, 61 R, 273/61 C, 61 D, DIG. 10; 524/908; 525/216; 260/998.14

[56] References Cited

U.S. PATENT DOCUMENTS

| | | | |
|---|---|---|---|
| 3,816,358 | 6/1974 | Nordsiek et al. | 525/216 |
| 4,145,045 | 3/1979 | Pocklington | 273/61 C |
| 4,151,029 | 4/1979 | Jones-Hinton | 273/61 R |
| 4,306,719 | 12/1981 | Haines et al. | 260/998.14 |
| 4,580,781 | 4/1986 | Horiuchi et al. | 273/61 C |
| 4,592,550 | 6/1986 | Horiuchi | 273/61 C |
| 4,792,141 | 12/1988 | Llort | 273/235 R |
| 4,849,478 | 7/1989 | Mori et al. | 525/216 |

FOREIGN PATENT DOCUMENTS

| | | |
|---|---|---|
| 2142990 | 2/1973 | France . |
| 2038643 | 7/1980 | United Kingdom . |

*Primary Examiner*—V. Millin
*Assistant Examiner*—Steven B. Wong
*Attorney, Agent, or Firm*—Armstrong, Westerman, Hattori, McLeland & Naughton

[57] ABSTRACT

A pressureless tennis ball which has excellent rebound properties and produces a satisfactory feeling of striking retained over a long period of time, the tennis ball having a hollow spherical core made from a rubber composition containing 3 to 50% by weight of a trans-polyoctenamer rubber based on the whole rubbers used.

8 Claims, No Drawings

PRESSURELESS TENNIS BALL

BACKGROUND OF THE INVENTION

The present invention relates to a pressureless tennis ball having excellent rebound properties and a good feeling of striking.

Two types of tennis balls are known, one being pressurized tennis balls wherein the hollow core is pressurized by means of air or a certain kind of gas to about 0.6–1.2 kg/cm$^2$ higher pressure than atmospheric pressure, and the other being pressureless tennis balls wherein the internal pressure of the hollow core is approximately equal to atmospheric pressure, for example, the excess pressure being 0 or up to about 0.4 kg/cm$^2$.

The pressurized tennis balls have good rebound properties (flight performance) and give a good feeling when struck by a racket, since the pressure of air or the gas in the core contributes to improvements in rebound properties of the balls and feeling of striking the balls. However, air or the gas of super-atmospheric pressure contained in the core gradually diffuses out through the core wall owing to a pressure difference between the inside and outside of the core, and the internal pressure decreases in several months. Consequently, the rebound properties of the balls are reduced, thus the flight of the balls is reduced and the balls are no longer satisfactorily used. It is accordingly necessary for the pressurized tennis balls to be used within a certain specified term after the manufacture, or to be kept in pressurized containers prior to use for preventing the decrease of the internal pressure. However, these procedures are inconvenient and expensive.

The pressureless tennis balls have been developed in order to eliminate such a defect of the pressurized tennis balls. The pressureless tennis balls have no problem of the lowering in ball properties resulting from the decrease of the pressure in the core as encountered in pressurized tennis balls. However, the rebound properties, feeling of striking and the like of the pressureless tennis balls must rely on the impact resilience of the rubber composition itself which constitutes the core, because there is no contribution of the pressure in the core to the rebound properties and striking feeling of the balls. The rebound properties and striking feeling on the level of pressurized tennis balls cannot be achieved by merely applying rubber compositions used for the cores of pressurized tennis balls to the production of cores for the pressureless tennis balls.

Accordingly, in order to bring the rebound properties and the feeling of striking close to those of the pressurized tennis balls, it is proposed to improve these properties by incorporating in rubber compositions for tennis ball core a high styrene resin, a rubber such as ethylene-propylene rubber or ethylene-propylene-diene rubber, or an additive such as an ionomer resin or wood flour as disclosed, for example, in Japanese Patent Publication Kokai No. 55-96171 and No. 54-34934 and Japanese Patent Publication Kokoku No. 46-25289.

However, pressureless tennis balls available at the present time are hard and do not give a satisfactory feeling when struck by a racket. The softer ones are poor in flight and do not give a feeling of striking like pressurized tennis balls. Moreover, the softer pressureless tennis balls have the defects that the resistance to deformation is markedly lowered by repeated forceful striking during game or playing, so the feeling of striking becomes too soft and the flight of balls also further decreases.

It is an object of the present invention to provide a pressureless tennis ball having characteristics comparable to those of pressurized tennis balls such as rebound properties and feeling of striking.

The above and other objects of the present invention will become apparent from the description hereinafter.

SUMMARY OF THE INVENTION

It has now been found that the above object of the present invention can be achieved when a trans-polyoctenamer rubber is used as a rubber component with other rubbers such as natural rubber and synthetic rubbers in the preparation of tennis ball cores.

In accordance with the present invention, there is provided a pressureless tennis ball comprising a hollow core and a cover therefor, said core being made from a rubber composition comprising a rubber component containing 3 to 50% by weight of a trans-polyoctenamer rubber.

By the use of trans-polyoctenamer rubber in an amount of 3 to 50% by weight based on the whole rubbers in rubber composition, the impact resilience of the tennis ball core is raised, thereby improving the rebound properties of the ball, and the deformation is made proper. Thus, the rebound properties and feeling of striking comparable to those of pressurized tennis balls can be obtained, and also the lowering of the feeling of striking owing to repeated striking can be decreased.

The term "pressureless tennis ball" as herein used means a tennis ball comprising a hollow spherical core having an internal pressure substantially equal to atmospheric pressure or an internal pressure of up to 0.4 kg/cm$^2$ above atmospheric pressure.

DETAILED DESCRIPTION

The trans-polyoctenamer rubber used in the present invention is a polymer prepared from cyclooctene. Cyclooctene is synthesized from 1,3-butadiene through 1,5-cyclooctadiene.

The trans-polyoctenamer rubber can be prepared by metathesis polymerization of cyclooctene which produces a polyoctenamer and finally provides a mixture of linear and cyclic macromolecules. The metathesis polymerization is carried out according to a known method.

The trans-polyoctenamer rubber is also commercially available. For example, it is commercially available under the trade mark "VESTENAMER" from Hüls AG. Representative examples of such a rubber usable in the present invention are, for example, VESTENAMER 8012 (trans content about 80%, melting point about 54° C.) and VESTENAMER 6213 (trans content about 60%, melting point about 30° C.).

Trans-polyoctenamer rubbers having a molecular weight of 50,000 to 200,000 (as measured by GPC), a trans content of at least 50% and a degree of crystallization of 5 to 50% (as measured by DSC secondary fusion) are usually employed in the present invention.

The trans-polyoctenamer rubber is used in an amount of 3 to 50% by weight, preferably 5 to 40% by weight, based on the whole rubbers to be used in a rubber composition for preparing hollow cores. When the content of the trans-polyoctenamer rubber in the rubber component of the core rubber composition is less than 3% by weight, the hardness and impact resilience of the core are not sufficiently raised to improve the rebound properties and striking feeling of the ball. In that case, if a high styrene resin or the like is further added in a large amount in order to raise the hardness of the core, the obtained ball gives a hard feeling, thus no pressureless tennis ball having a good feeling of striking is obtained. When the content of the trans-polyoctenamer rubber in the rubber component is more than 50% by weight, the obtained ball gives a hard feeling of striking and also the rebound properties are lowered.

Usual rubbers conventionally used for the preparation of tennis balls can be used as the rubbers to be used with the trans-polyoctenamer rubber in the present invention. Examples of the rubbers used with the trans-polyoctenamer rubber in the present invention are natural rubber and synthetic rubbers, e.g. a conjugated diene rubber such as cis-1,4-polybutadiene, trans-polybutadiene, polyisoprene or styrene-butadiene rubber, and an ethylene-propylene rubber such as an ethylene-propylene copolymer rubber (EPM) or an ethylene-propylene-diene rubber (EPDM). These rubbers may be used alone or in admixture thereof. Natural or synthetic polyisoprene, the butadiene rubbers, the ethylene-propylene rubbers, and mixtures thereof are preferable, and these rubbers may contain a small amount of other synthetic rubbers. Use of natural rubber or cis-1,4-polybutadiene with trans-polyoctenamer rubber is particularly preferred.

The rubber composition for preparing the hollow cores of pressureless tennis balls according to the present invention may contain additives, in addition to the rubber component, e.g. sulfur or an organic sulfur curing agent, one or more of curing accelerators such as a thiazole compound, a sulfenamide compound, a thiuram compound, a guanidine compound and other known curing accelerators; zinc oxide and stearic acid which are used as activators; an inorganic or organic filler such as basic magnesium carbonate, clays, calcium carbonate, cellulose powder, white carbon (silica) or wood flour. Further, a thermoplastic resin such as a high styrene resin or polyethylene may be suitably added to the core rubber composition for the purpose of raising the ball compression with maintaining the rebound of balls.

In a preferred example of the rubber composition for the hollow core, the composition contains, based on 100 parts by weight of the rubber component containing 3 to 50% by weight of trans-polyoctenamer rubber, 3 to 50 parts by weight of a thermoplastic resin such as high styrene resin or polyethylene, 5 to 40 parts by weight of a filler, 1 to 15 parts by weight of zinc oxide, 0.5 to 2 parts by weight of stearic acid, 1 to 6 parts by weight of sulfur or an organic sulfur curing agent and 1 to 6 parts by weight of a curing accelerator.

The thickness of the core wall is usually selected from 3.5 to 5.0 mm as applied conventionally to the core of pressureless tennis balls.

The pressureless tennis balls of the present invention are obtained by producing a ball core from the core rubber composition and covering the ball core with a felt or textile covering.

Kneading for preparing the core rubber composition according to the present invention, formation of the ball cores from the rubber composition and formation of pressureless tennis balls from the balls cores can be made by conventional procedures. For example, the core rubber composition is prepared by mixing a rubber component with additives other than the curing agent such as sulfur or an organic sulfur compound and the curing accelerator by means of a suitable mixing machine such as a Banbury mixer or a kneader, adding the curing agent and the curing accelerator to the mixture on rolls and further mixing them.

The ball core is prepared from the composition, for example, by forming the prepared rubber composition into a sheet, extruding it into a rod form by an extruder, placing the cut rod in a mold for producing half-shells, compression-molding it in the mold to produce half-shells, joining a pair of half-shells so as to form a hollow sphere and compression-molding the shells in a mold to give a ball core. At that time, no blowing agent as used to raise the internal pressure to more than 0.6 kg/cm$^2$ in the manufacturing of pressurized tennis balls is used, but only air of atmospheric pressure is included in the ball core. Also, introduction of a high pressure air or gas into the obtained ball core is not conducted. Therefore, the internal pressure of the obtained ball core is substantially equal to atmospheric pressure. If desired, a blowing agent or a pressurized air or gas may of course be introduced into the core so long as the internal pressure of the core is at most 0.4 kg/cm$^2$. The ball core is then formed into a tennis ball, for example, by covering the core with a felt or textile cover such as a melton cover, and compression-molding the covered core in a mold for ball.

The pressureless tennis balls of the present invention have excellent rebound properties and produce a satisfactory feeling like pressurized tennis balls when struck by a racket. Moreover, the initial feeling of striking is kept for a long period of time even if the balls are repeatedly struck by a racket.

The present invention is more specifically described and explained by means of the following Examples, in which all % and parts are by weight unless otherwise noted.

EXAMPLES 1 to 5 and COMPARATIVE EXAMPLES 1 to 4

Rubber compositions for hollow cores were prepared according to the recipes shown in Table 1 by kneading a rubber component and additives other than sulfur and a curing accelerator in a Banbury mixer, and then kneading the mixture with sulfur and the accelerator on rolls.

Hollow cores having a thickness of 4.4 mm were prepared from the obtained rubber compositions and pressureless tennis balls were prepared by covering the cores with a melton cover according to procedures conventionally adopted to the manufacturing of pressureless tennis balls. That is to say, the rubber compositions were formed into sheets, extruded by an extruder in a rod form, placed in molds for forming half-shells, and compression-molded at 160° C. for 2 minutes to produce half-shells. A pair of the half-shells were joined so as to form a hollow sphere and compression-molded at 150° C. for 12 minutes in a mold for core. The thus obtained cores were covered with a melton cover and subjected to compression molding at 150° C. for 20 minutes in a mold for ball to produce pressureless tennis balls.

The results of measurement of physical properties and feeling of striking of the obtained pressureless tennis balls are shown in Table 2.

The measurement of the properties shown in Table 2 was made as follows:

Forward Deformation (mm)

A tennis ball was subsequently compressed about 2.54 cm in three directions at right angles to each other. This procedure was repeated 3 times. That is to say, the ball was compressed 9 times total. In 2 hours after the above preliminary compression, the deformation was measured by a Stevens compression tester in the following manner.

The ball was compressed with an initial load of 3.5 pounds (1.575 kg) and the deformation was measured, and the ball was then compressed with a load of 18 pounds (8.165 kg) and the deformation was measured. The forward deformation is expressed by the difference (mm) between the deformation by a load of 3.5 pounds and the deformation by a load of 18 pounds.

Return Deformation (mm)

After measuring the deformation in the above forward deformation test, the ball was further compressed up to a deformation of 2.54 cm. Then the compression was reduced to a load of 18 pounds (8.165 kg), and the deformation was measured.

Rebound (cm)

A tennis ball was dropped from a height of 100 inches (254 cm) onto a concrete base, and the bound of the ball (height from the concrete base to the bottom of the ball) was measured. The measurement was repeated 3 times and the average was obtained.

TABLE 1

| Ingredients (part) | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|
| Natural rubber | 60 | 50 | 10 | 10 | 10 | 20 | 10 | 60 | 20 |
| Cis-1,4-polybutadiene*1 | 30 | 30 | 60 | 65 | — | 80 | 50 | 40 | 20 |
| Cis-1,4-polybutadiene*2 | — | — | — | — | 60 | — | — | — | — |
| High styrene resin*3 | 8 | 9 | 5 | 7 | 5 | 20 | 5 | 30 | — |
| EPDM*4 | — | — | — | — | — | — | 40 | — | — |
| VESTENAMER 8012*5 | 10 | — | 30 | — | 30 | — | — | — | 60 |
| VESTENAMER 6213*6 | — | 20 | — | 25 | — | — | — | — | — |
| Zinc oxide | 5 | 5 | 5 | 5 | 5 | 3 | 7 | 5 | 5 |
| Wood flour | 15 | 15 | 15 | 15 | 15 | 10 | 12.5 | — | 10 |
| Kaolin clay | — | — | — | — | — | — | — | 20 | — |
| Stearic acid | 1 | 1 | 1 | 1 | 1 | 1 | 1 | 2 | 1 |
| Sulfur | 3.5 | 3.5 | 3.5 | 3.5 | 3.5 | 3.5 | 3.5 | 2.5 | 3.5 |
| Accelerator DM*7 | 1.5 | 1.5 | 1.5 | 1.5 | 1.5 | 1.5 | 1.5 | 1.5 | 1.5 |
| Accelerator DPG*8 | 2.0 | 2.0 | 2.0 | 2.0 | 2.0 | 2.0 | 2.0 | 2.0 | 2.0 |

(Notes)
*1 Product of Japan Synthetic Rubber Co., Ltd. (trade mark "JSR BR11")
*2 Product of Ube Industries, Ltd. (trade mark "UBEPOL BR15")
*3 High styrene resin (styrene content 85%) made by Nippon Zoen Co., Ltd. (trade mark "Nippol 2007J")
*4 Ethylene-propylene-diene rubber made by Sumitomo Chemical Co., Ltd. (trade mark "Esprene 512F")
*5 Trade mark, Trans-polyoctenamer rubber made by Hüls AG (trans content: about 80%)
*6 Trade mark, Trans-polyoctenamer rubber made by Hüls AG (trans content: about 60%)
*7 Dibenzothiazyl disulfide
*8 Diphenylguanidine

TABLE 2

| | Weight (g) | Forward deformation (mm) | Return deformation (mm) | Rebound (cm) | Feeling of striking |
|---|---|---|---|---|---|
| Ex. 1 | 57.6 | 6.3 | 9.3 | 143 | Feeling like pressurized tennis ball; good flight and a little change by repeated striking |
| Ex. 2 | 57.7 | 6.1 | 9.2 | 144 | Same as Ex. 1 |
| Ex. 3 | 57.5 | 6.0 | 9.0 | 145 | Same as Ex. 1 |
| Ex. 4 | 57.7 | 6.1 | 9.2 | 144 | Same as Ex. 1 |
| Ex. 5 | 57.8 | 6.0 | 9.1 | 146 | Same as Ex. 1 |
| Com. Ex. 1 | 57.8 | 5.8 | 9.5 | 138 | Proper hardness, but poor in flight and heavy feeling; large change by repeated striking; low rebound |
| Com. Ex. 2 | 57.8 | 5.8 | 8.8 | 135 | Slightly hard feeling and poor in flight; large change by repeated striking; low rebound |
| Com. Ex. 3 | 57.6 | 4.9 | 8.1 | 132 | Very hard feeling; low rebound |
| Com. Ex. 4 | 57.7 | 5.6 | 8.8 | 137 | Hard and heavy feeling; poor in flight; low rebound |
| Regulation of ITF | 56.7 to 58.5 | 5.6 to 7.4 | 8.9 to 10.8 | 135 to 147 | — |

(Note)
ITF: International Tennis Federation

As shown in Table 2, the pressureless tennis balls of Examples 1 to 5 according to the present invention show a large rebound as compared with the tennis balls of Comparative Examples 1 to 4, and also have proper forward and return deformation values. These results show that the pressureless tennis balls of the present invention have high rebound properties. Also, the tennis balls of Examples 1 to 5 have a similar feeling of striking to that of pressurized tennis balls. They do not give a hard feeling of striking and show a good flight performance. Further, they show only a little change in feeling of striking by repeated striking. Thus, it would be understood that the pressureless tennis balls of the present invention have good characteristics acceptable sufficiently to high class tennis tournaments.

In addition to the ingredients used in the Examples, other ingredients can be used in the Examples as set forth in the specification to obtain substantially the same results.

What is claimed is:

1. A pressureless tennis ball comprising a hollow spherical core and a cover therefor, said core being made from a rubber composition comprising a rubber component containing 3 to 50% by weight of a trans-polyoctenamer rubber.

2. The tennis ball of claim 1, wherein said rubber component comprises 3 to 50% by weight of a trans-polyoctenamer rubber and a conjugated diene rubber.

3. The tennis ball of claim 1, wherein said rubber component comprises 3 to 50% by weight of a trans-polyoctenamer rubber and a blend of a natural or synthetic polyisoprene and cis-1,4-polybutadiene.

4. The tennis ball of claim 1, wherein said rubber component consists essentially of 3 to 50% by weight of a trans-polyoctenamer rubber and at least one member selected from the group consisting of natural rubber, cis-1,4-polybutadiene, trans-polybutadiene, a styrene-butadiene rubber, polyisoprene and an ethylene-propylene rubber.

5. The tennis ball of claim 1, wherein said rubber composition comprises a rubber component containing 3 to 50% by weight of a trans-polyoctenamer rubber and 3 to 50 parts by weight, per 100 parts by weight of said rubber component, of a thermoplastic resin selected from the group consisting of a high styrene resin and a polyethylene.

6. The tennis ball of claim 1, wherein said trans-polyoctenamer rubber has a molecular weight of 50,000 to 200,000.

7. The tennis ball of claim 1, wherein said trans-polyoctenamer rubber has a trans content of at least 50%.

8. The tennis ball of claim 1, wherein said trans-polyoctenamer rubber has a degree of crystallization of 5 to 50%.

\* \* \* \* \*